United States Patent
Murakami et al.

(10) Patent No.: US 9,256,953 B2
(45) Date of Patent: Feb. 9, 2016

(54) EXPRESSION ESTIMATION DEVICE, CONTROL METHOD, CONTROL PROGRAM, AND RECORDING MEDIUM

(71) Applicant: OMRON Corporation, Kyoto-shi, Kyoto (JP)

(72) Inventors: Tatsuya Murakami, Osaka (JP); Takashi Ohta, Shiga (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 14/228,108

(22) Filed: Mar. 27, 2014

(65) Prior Publication Data

US 2014/0307926 A1 Oct. 16, 2014

(30) Foreign Application Priority Data

Apr. 15, 2013 (JP) ................. 2013-084868

(51) Int. Cl.
*G06K 9/00* (2006.01)
*G06T 7/20* (2006.01)

(52) U.S. Cl.
CPC .............. *G06T 7/20* (2013.01); *G06K 9/00315* (2013.01); *G06K 9/00355* (2013.01); *G06T 2207/30196* (2013.01); *G06T 2207/30201* (2013.01)

(58) Field of Classification Search
CPC ........... G06T 2207/30196; G06T 2207/30201; G06T 7/20; G06K 9/00315; G06K 9/00355
See application file for complete search history.

(56) References Cited

U.S. PATENT DOCUMENTS

2011/0007142 A1* 1/2011 Perez et al. ..................... 348/77

FOREIGN PATENT DOCUMENTS

| JP | 2005-237561 A | 9/2005 |
| JP | 2010-066844 A | 3/2010 |
| KR | 2012-0049218 A | 5/2012 |

OTHER PUBLICATIONS

Notification of Preliminary Rejection issued in corresponding Korean Application No. 10-2014-0032601, mailed on May 19, 2015 (6 pages).

* cited by examiner

*Primary Examiner* — Tom Y Lu
(74) *Attorney, Agent, or Firm* — Osha Liang LLP

(57) ABSTRACT

An expression estimation device configured to estimate an expression of a person from an image has an expression determination unit that analyzes the image of the person to generate first expression information indicating an expression of the person, a motion determination unit that analyzes the image of the person to determine a type of motion of the person, and an expression estimation unit that generates second expression information indicating the expression of the person according to the first expression information generated by the expression determination unit and the type of motion determined by the motion determination unit.

12 Claims, 19 Drawing Sheets

FIG. 3

| Expression | Score |
|---|---|
| Delight | 5 |
| Anger | 53 |
| Sorrow | 30 |
| Hate | 55 |
| Fear | 49 |
| Surprise | 22 |

Result of only expression

| Folded arms | |
|---|---|
| Delight | −10 |
| Anger | +27 |
| Sorrow | −17 |
| Hate | −13 |
| Fear | +3 |
| Surprise | −12 |

Addition table for motion

| Expression | Score |
|---|---|
| Delight | −5 |
| Anger | 80 |
| Sorrow | 13 |
| Hate | 42 |
| Fear | 52 |
| Surprise | 10 |

Result of expression and motion

Folded arms

Shaking finely

Looking at watch

| Clenched fist | |
|---|---|
| Delight | × |
| Anger | ○ |
| Sorrow | △ |
| Hate | △ |
| Fear | ○ |
| Surprise | × |

FIG. 10

| Folded arms | T5 |
|---|---|
| Delight | −10 |
| Anger | +27 |
| Sorrow | −17 |
| Hate | −13 |
| Fear | +3 |
| Surprise | −12 |

Addition table of Mr./Ms. A with respect to motion

| Folded arms | T6 |
|---|---|
| Delight | −10 |
| Anger | +5 |
| Sorrow | −12 |
| Hate | +3 |
| Fear | +11 |
| Surprise | −2 |

Addition table of Mr./Ms. B with respect to motion

| Folded arms | T7 |
|---|---|
| Delight | −10 |
| Anger | +27 |
| Sorrow | −17 |
| Hate | −13 |
| Fear | +3 |
| Surprise | −12 |

Addition table of woman in her thirties with respect to motion

| Folded arms | T8 |
|---|---|
| Delight | 0 |
| Anger | +5 |
| Sorrow | 0 |
| Hate | 0 |
| Fear | +10 |
| Surprise | 0 |

Addition table of woman of 3 to 10 years old with respect to motion

| Expression | Score | T11 |
|---|---|---|
| Delight | 5 |
| Anger | 80 |
| Sorrow | 30 |
| Hate | 55 |
| Fear | 49 |
| Surprise | 22 |

Result of only expression

| Expression | Score | T12 |
|---|---|---|
| Delight | 5 |
| Anger | 80 |
| Sorrow | 30 |
| Hate | 55 |
| Fear | 49 |
| Surprise | 22 |

Final result

| Expression | Score |
|---|---|
| Delight | 5 |
| Anger | 53 |
| Sorrow | 30 |
| Hate | 55 |
| Fear | 49 |
| Surprise | 22 |

| Expression | Score |
|---|---|
| Delight | 80 |
| Anger | 0 |
| Sorrow | 0 |
| Hate | 0 |
| Fear | 0 |
| Surprise | 0 |

EXPRESSION ESTIMATION DEVICE, CONTROL METHOD, CONTROL PROGRAM, AND RECORDING MEDIUM

BACKGROUND

1. Field

The present invention relates to a technology for estimating an expression of a person in an image.

2. Related Art

Nowadays, with the progress of an image analysis technology, a face portion of a person can be specified from an image, or an expression of the face can be estimated. For example, in Japanese Unexamined Patent Publication No. 2010-066844, the face is detected from a moving image content to recognize the expression of the face, and a feeling of the person is determined from existence or non-existence or size of the motion of the person in which the face is detected and existence or non-existence or volume of a sound made by the person. In Japanese Unexamined Patent Publication No. 2005-237561, an expression and a body motion of the person image included in image information are detected, and mind and body conditions of a user are detected based on the expression and the body motion as well as sound information and biological information which are acquired by sensors.

Sometimes false estimation, in which the expression different from the feeling of the person in the image is estimated, is generated in the expression estimation based on the image. For example, because the expression of hate and the expression of anger are similar to each other, sometimes the expression is estimated to be anger in the case that the person in the image feels the hate, or the expression is estimated to be hate in the case that the person feels the anger. Therefore, there is a demand to enhance accuracy of the expression estimation such that the generation of the false estimation is minimized.

However, in the conventional technology as described above, unfortunately the accuracy of expression estimation of the person in the image cannot be enhanced. This is because, in the technology of Japanese Unexamined Patent Publication No. 2010-066844, the face expression is used as one of factors determining the feeling of the person, but the technology is not aimed at the estimation of the expression. Similarly, in the technology of Japanese Unexamined Patent Publication No. 2005-237561, the expression is used as one of factors detecting the mind and body conditions of the user, but the technology is not aimed at the estimation of the expression. Therefore, the accuracy of the expression estimation cannot be enhanced.

SUMMARY

An expression estimation device according to one or more embodiments of the present invention enhances the accuracy of expression estimation of a person in an image.

In accordance with one or more embodiments of the present invention, an expression estimation device configured to estimate an expression of a person from an image, the expression estimation device includes: an expression determination unit configured to analyze the image of the person to generate first expression information indicating an expression of the person; a motion determination unit configured to analyze the image of the person to determine a type of motion of the person; and an expression estimation unit configured to generate second expression information indicating the expression of the person according to the first expression information generated by the expression determination unit and the type of motion determined by the motion determination unit.

In accordance with one or more embodiments of the present invention, a method for controlling an expression estimation device configured to estimate an expression of a person from an image, the control method includes: an expression determination step of analyzing the image to generate first expression information indicating the expression of the person; a motion determination step of analyzing the image to determine a type of motion of the person; and an expression estimation step of generating second expression information indicating the expression of the person according to the first expression information generated in the expression determination step and the type of motion determined in the motion determination step.

According to the configuration, the person image is analyzed to generate the first expression information indicating the expression of the person, and the type of motion of the person is determined. Then the second expression information is generated according to the generated first expression information and the determined motion. Because the feeling of the person emerges in the motion of the person, the expression fit to the feeling of the person can be estimated compared with the case that the expression is specified without considering the motion. That is, the accuracy of the expression estimation can be enhanced.

According to one or more embodiments of the present invention, the first expression information is information in which a fitness for each of the different expressions is indicated in terms of numerical value, and the expression estimation unit generates the second expression information by correcting the numerical value of the first expression information using predetermined correction information on each type of motion.

According to the configuration, the first expression information is corrected according to the type of motion, so that the expression fit to the feeling of the person can be estimated. In the case that the fitness is indicated in terms of numerical value with respect to each of different expressions, sometimes the plurality of expressions are hardly distinguished from each other because the numerical values of the expressions are close to each other. According to the configuration, the difficulty can be solved.

According to one or more embodiments of the present invention, the expression estimation device further includes a motion registration unit configured to store the motion assigned in the image while correlating the type of motion and the correction information on the motion with each other.

According to the configuration, the type of motion assigned in the image and the correction information are stored while correlated with each other. Therefore, the motion that cannot be detected in the determination of the type of motion can be detected, and the correction can be performed according to the type of motion.

According to one or more embodiments of the present invention, the expression estimation device further includes an attribute determination unit configured to analyze the image to determine which predetermined attribute corresponds to the person. In the expression estimation device, the expression estimation unit generates the second expression information by correcting the numerical value of the first expression information using the predetermined correction information on each type of motion, the correction information corresponding to the attribute determined by the attribute determination unit.

According to the configuration, the attribute of the person is determined, and the second expression information is generated by correcting the numerical value of the first expression information using the correction information, which is decided in each type of motion and corresponds to the attribute, so that the accuracy of the expression estimation can further be enhanced. This is because, even in the same motion, the cause of the motion may depend on the attribute. Any attribute may be used as long as the attribute indicates the feature or characteristic of the person. For example, the attributes is an age and sex. Alternatively, the attribute may be one that identifies an individual.

According to one or more embodiments of the present invention, the expression estimation device further includes a fitness proximity determination unit configured to determine whether a difference between the fitness having the largest numerical value and the fitness having the second largest numerical value in the first expression information is greater than or equal to a predetermined upper limit. In the expression estimation device, the expression estimation unit generates the first expression information as the second expression information without using the correction information when the fitness proximity determination unit determines that the difference is greater than or equal to the upper limit, and the expression estimation unit generates the second expression information using the correction information when the fitness proximity determination unit determines that the difference is less than the upper limit.

In the case of the large difference between the fitness having the largest numerical value and the fitness having the second largest numerical value in the first expression information, even if the first expression information is directly used as the second expression information, the accuracy of the expression estimation is not lowered because the expression having the largest fitness can easily be specified. On the other hand, in the case of the small difference between the fitness having the largest numerical value and the fitness having the second largest numerical value in the first expression information, the expression having the largest fitness is hardly narrowed down to one expression. In such cases, desirably the motion is considered.

According to the configuration, the correction information is not used in the case that the difference between the fitness having the largest numerical value and the fitness having the second largest numerical value in the first expression information is greater than or equal to the predetermined upper limit, and the correction information is used in the case that the difference is less than the upper limit. Therefore, the estimation accuracy is maintained by determining the type of motion only in the case of the high necessity, and the processing concerned with the determination of the type of motion can be eliminated to reduce the number of processing steps in the case of the low necessity.

According to one or more embodiments of the present invention, the expression estimation device further includes a fit expression determination unit configured to determine whether the expression in which the fitness has the largest numerical value in the first expression information is matched with a predetermined expression, and to decide whether the motion determination unit determines the type of motion according to a result of the determination. In the expression estimation device, the expression estimation unit generates the second expression information using the correction information when the motion determination unit determines the type of motion, and the expression estimation unit generates the first expression information as the second expression information without using the correction information when the motion determination unit does not determine the type of motion.

As a result of the study performed by the inventor, it is found that easiness of generation of the false estimation depends on the type of expression having the largest fitness in the first expression information. Therefore, for the expression in which the false estimation is hardly generated, the accuracy of the expression estimation is hardly lowered even if the first expression information is directly used as the second expression information. On the other hand, for the expression in which the false estimation is easily generated, desirably the motion is considered.

Therefore, according to the configuration, whether the expression having the largest numerical value of the fitness is matched with the predetermined expression is determined, and whether the type of motion is determined is decided according to the result of the determination. In the case that the type of motion is determined, the second expression information is generated using the correction information corresponding to the type of motion. On the other hand, in the case that the type of motion is not determined, the first expression information is generated as the second expression information. Therefore, the estimation accuracy is maintained by determining the type of motion only in the case of the high necessity, and the processing concerned with the determination of the type of motion can be eliminated to reduce the number of processing steps in the case of the low necessity.

The expression estimation device according to one or more embodiments of the present invention may be constructed with a computer. In this case, one or more embodiments of the present invention also includes a control program that causes the computer to execute each step of the control method to construct the expression estimation device and a computer-readable recording medium in which the control program is recorded.

As described above, the expression estimation device according to one or more embodiments of the present invention includes: the expression determination unit configured to analyze the image of the person to generate the first expression information indicating the expression of the person; the motion determination unit configured to analyze the image of the person to determine the type of motion of the person; and the expression estimation unit configured to generate the second expression information indicating the expression of the person according to the first expression information generated by the expression determination unit and the type of motion determined by the motion determination unit.

The method for controlling the expression estimation device according to one or more embodiments of the present invention includes: the expression determination step of analyzing the image to generate the first expression information indicating the expression of the person; the motion determination step of analyzing the image to determine the type of motion of the person; and the expression estimation step of generating the second expression information indicating the expression of the person according to the first expression information generated in the expression determination step and the type of motion determined in the motion determination step.

The expression fit to the feeling of the person can be estimated, and therefore advantageously the accuracy of the expression estimation can be enhanced.

BRIEF DESCRIPTION OF THE DRAWINGS

FIG. 3 is a view illustrating a specific example of the expression estimation method;

FIG. 10 is a view illustrating an example of an individually-set motion score used by the expression estimation device;

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
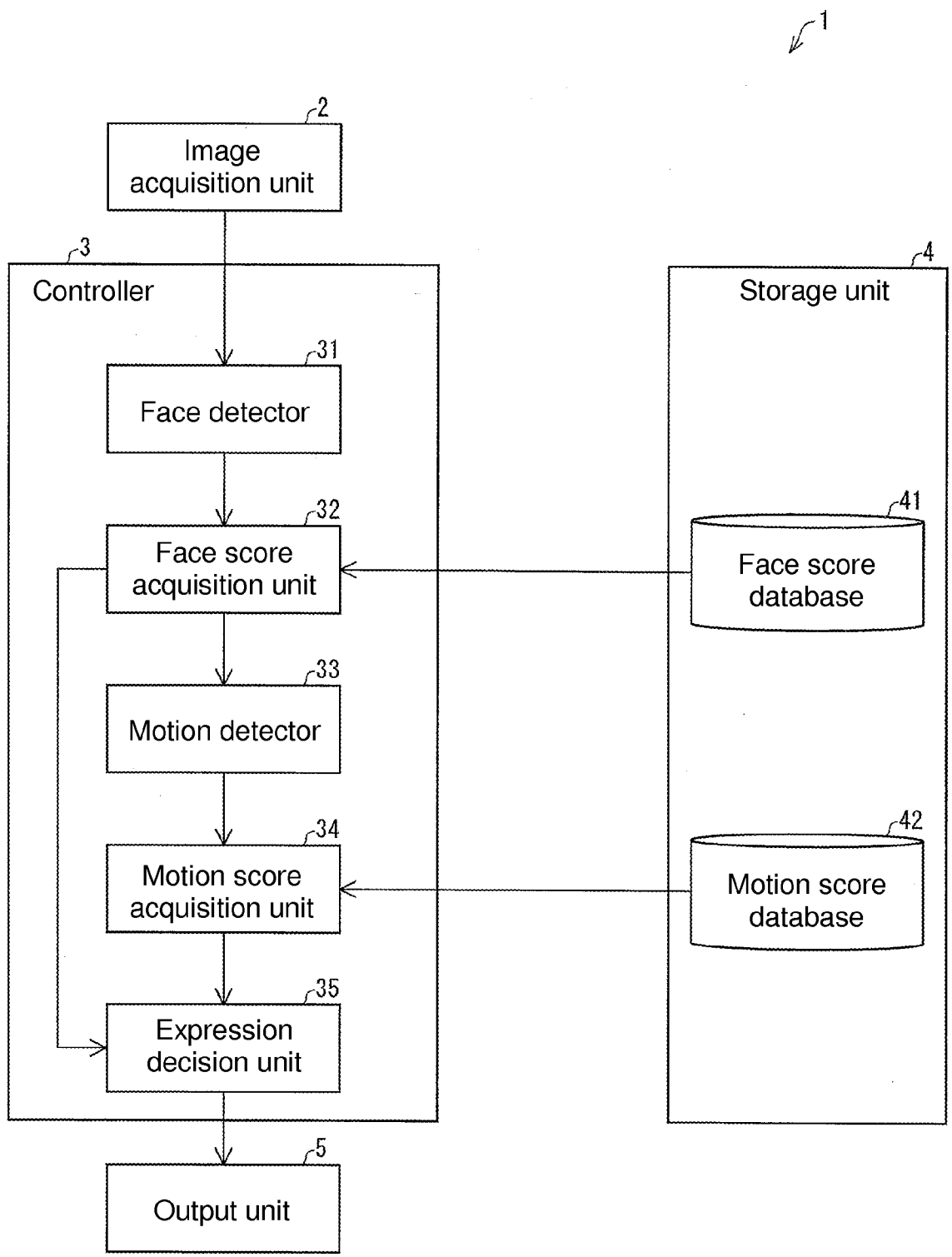
FIG. 1 is a block diagram illustrating a main-part configuration of an expression estimation device according to a first embodiment of the present invention.
Figure 2A:
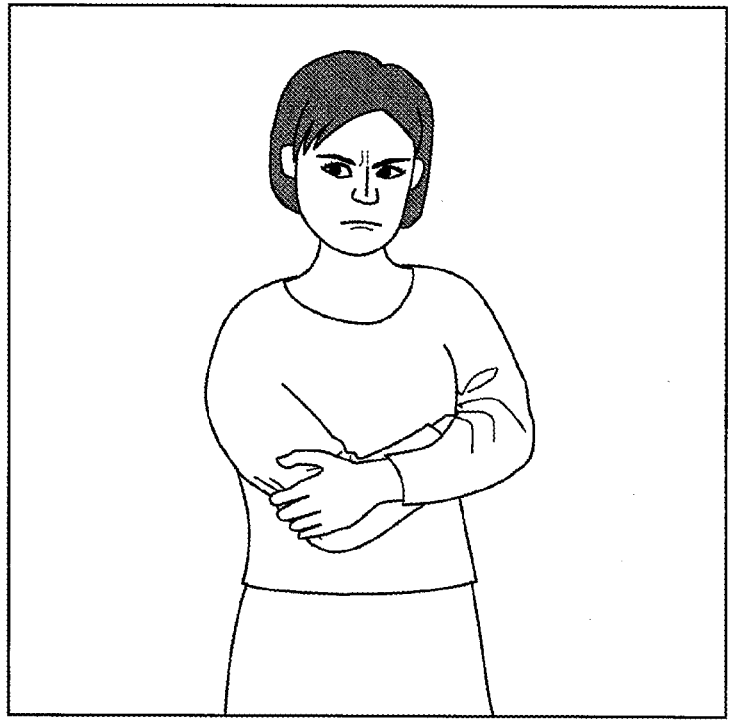
FIG. 2A-2B are views schematically illustrating an expression estimation method performed by the expression estimation device.
Figure 2B:
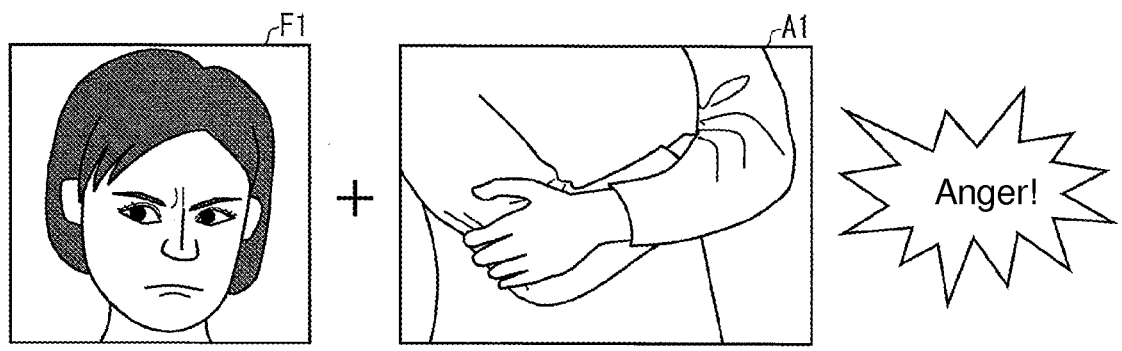

A first embodiment of the present invention will be described with reference to FIGS. 1 to 5. An expression estimation method of the first embodiment will be schematically described with reference to FIGS. 2A-2B. FIGS. 2A-2b are views schematically illustrating the expression estimation method performed by an expression estimation device of the first embodiment.

As we see in expressions such as a look, a complexion, a countenance, and a physiognomy, a human reflects an inner mental state (feeling) in a face. Accordingly, the feeling, namely, the expression expressed by the face can be estimated based on a face image. However, in the case that the expression is estimated from the face image, the similar expressions and different feelings such as "hate" and "anger" is hardly estimated while accurately distinguished from each other, sometimes a false expression estimation result is output.

By way of example, a human image in FIG. 2A can be interpreted as both the "hate" and the "anger" based on only the expression shown by the face of the person. However, addition of information indicating that the person with the expression folds arms clearly explains that the expression of the person is not the "hate" but the "anger".

Therefore, as illustrated in FIG. 2B, the expression estimation device of the first embodiment estimates the expression of the person based on a face image F1 and a motion A1 of the person. Frequently the person consciously or unconsciously expresses the feeling by the motion (sign), so that estimation accuracy of the expression can be enhanced by considering what type of motion the person is performing.

For example, the face image F1 in FIG. 2B includes the person who furrows his or her brow and raises ends of his or her eyebrows. In the expression estimation device of the first embodiment, the expression of the person in the image is indicated as a numerical value by generating a face score that evaluates each of expression categories such as "delight", "anger", "sorrow", "hate", "fear", and "surprise".

The expression estimation device of the first embodiment detects the motion A1 of the folded arms of the person from the person image, and acquires a motion score in which the motion A1 is evaluated with respect to each of the expression categories. An expression score corresponding to each expression category is calculated by adding the face score and the motion score in each expression category, and output as a final expression estimation result.

Therefore, even if the expression of the "anger" and the expression of the "hate" are hardly distinguished from each other only from the face image F1 like the example in FIG. 2B, the expression of the person can be determined as not the "hate" but the "anger" from the motion A1 of the "folded arms".

The image used to estimate the expression may be either a still image or a moving image. For the moving image, one or a plurality of still images are extracted from still images constituting the moving image, and the generation of the face score and the detection of the motion are performed from the extracted still images. An average value of the face scores each of which is generated from each still image may be calculated in the case that the face score is generated from the plurality of still images. The still image used to generate the face score only needs to include the identical person, and the still image used to generate the face score may be identical to or different from the still image used to detect the motion.

Processing of obtaining a result score (second expression information) will be described below with reference to FIG. 3. The result score is the final expression estimation result in which the motion score (correction information) corresponding to the motion A1 is added to the face score (first expression information) based on the face image F1 in FIG. 2B. FIG. 3 illustrates a specific example of the expression estimation method.

Referring to FIG. 3, six expression categories of "delight", "anger", "sorrow", "hate", "fear", and "surprise" are set in a face score T1, and the score decided based on the face image F1 is correlated with each expression category. In the face score T1, a degree (fitness) fit to each expression category is indicated by numerical values of 0 to 100. That is, there is a high probability that the expression is the expression category concerned as the score comes close to 100, and there is a low probability that the expression is the expression category concerned as the score comes close to 0.

In the face score T1, the expression category having the largest score is the "hate" having the value of 55. However, the "anger" and the "fear" have the scores of 53 and 49 that are close to the scores of the "hate". In such cases, there is the high probability of false estimation, when the expression of the face image F1 is estimated to be the "hate" only because the "hate" has the largest score. This is because the accuracy enough to strictly distinguish between subtle expressions cannot be expected in the score obtained by analyzing the face image.

As illustrated in FIG. 3, the six expression categories identical to those of the face score T1 are set in a motion score T2 corresponding to the motion of the "folded arms", and the score corresponding to the motion of the "folded arms" is correlated with each expression category. In the first embodiment, it is assumed that the motion score T2 is used to correct the score of each expression category by adding the motion score T2 to the face score T1. Therefore, the negative score and the positive score are set in the motion score T2. When a certain motion is performed, the positive score is set to the expression having the high probability during the motion. When a certain motion is performed, the negative score is set to the expression having the low probability during the motion. For the motion score T2, similarly to the face score T1, the degree fit to each expression category may be indicated only by the positive score.

As illustrated in FIG. 3, a result score T3 of the final expression estimation is obtained by adding the motion score T2 to the face score T1. The face scores are close to one another in the three expression categories of "anger", "hate", and "fear" in the face score T1, and the difference among the scores in three expression categories increases in the result score T3. That is, the "anger", "fear", and "hate" have the scores of 80, 51, and 42, and it is clear that the "anger" has the largest score.

Accordingly, in the case that the expression of the expression category having the largest score is estimated to be the expression of the person in the image, for the example in FIG. 3, the expression of the person in the image is estimated to be the "anger" in consideration of the motion score T2, while estimated to be the "hate" only from the face score T1. It is considered that the motion of the "folded arms" is easily performed when the person has the feeling of the "anger" rather than the feeling of the "hate". Therefore, it is said that the more likely (higher accuracy) result is output compared with the expression estimation result obtained only by the face score.

By way of example, the six expression categories are used as the face score and the motion score. However, at least two expression categories may be used, and any type of expression category may be used. For example, the expression categories such as a "straight face" a "lack of expression", "confusion", an "impression", and "excitement" may be added. The previously-registered expression category may be used, or any expression category registered by a user may be used.

Sometimes the negative score is generated by the addition of the motion score T2 like the "delight" of the result score T3. It is also assumed that the score exceeding 100 is generated by the addition of the motion score T2. In such cases, the score may be set to 100 in the case that the score exceeds 100, and the score may be set to 0 in the case that the score becomes the negative value.

Figure 4:
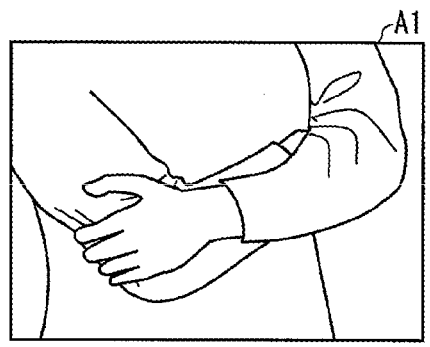
FIG. 4 is a view illustrating an example of a type of motion detected by the expression estimation device.
Figure 4:
Figure 4:
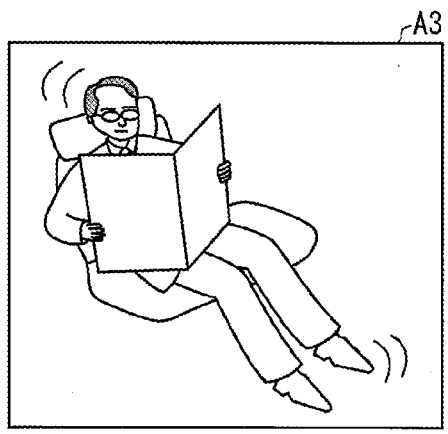
Figure 4:
Figure 4:
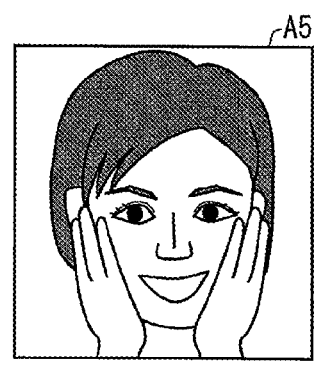

There is no limitation to the motion used in the expression estimation as long as the motion can be understood as a reflection of a feeling. FIG. 4 is a view illustrating an example of the type of motion detected by the expression estimation device. As illustrated in FIG. 4, a motion A2 in which the person sings a song, a motion A3 in which the person shakes finely (unconsciously shaking or tapping), a motion A4 in which the person looks at a watch, and a motion A5 in which the person raises hands to the own face can be used as the expression estimation in addition to the motion A1 in which the person folds the arms. Additionally, it is also considered that the feeling of the person emerges in typical gesture motions such as a motion (cheers) in which arms are raised high and a motion in which shoulders are shrugged with palms oriented upward, so that such motions can be suitably used in the expression estimation.

It is necessary to analyze the moving image in the case that the motion such as the motion A3 in which the person shakes finely is detected. On the other hand, other examples of the motions can be detected by analyzing either the moving image or the still image. In the case that the plurality of registered motions are detected, the motion scores corresponding to all the types of detected motions may be used, or a priority may previously be set to each type of motion to use only the motion score corresponding to the one motion. In the case that the plurality of motion scores are used, an arithmetic average of the motion scores may be obtained and used.

(Configuration of Expression Estimation Device)

A configuration of the expression estimation device of the first embodiment will be described below with reference to FIG. 1. FIG. 1 is a block diagram illustrating a main-part configuration of an expression estimation device 1 of the first embodiment. As illustrated in FIG. 1, the expression estimation device 1 includes an image acquisition unit 2, a controller 3, a storage unit 4, and an output unit 5. The image acquisition unit 2 acquires the image of the person who becomes a feeling estimation target. There is no particular limitation to an acquisition source of the image. For example, the image may be acquired from an image capturing device, such as a digital camera or a digital video camera, which has a function of capturing the image. The image captured by a scanner may be acquired, or the image may be acquired through a communication network such as the Internet.

The storage unit 4 is a storage device in which various pieces of data used by the expression estimation device 1 are stored. In the example in FIG. 1, a face score database 41 and a motion score database 42 are stored in the storage unit 4. The face score database 41 and the motion score database 42 may be stored in an external storage device of the expression estimation device 1 as long as the controller 3 can refer to the databases.

The face score database 41 is used to generate a face score (see T1 in FIG. 3) indicating the expression of the person from the face image. For example, the image constituting a model of the expression of each expression category may be registered in the face score database 41. In this case, the score of each expression category can be obtained by digitalizing a matching degree of the model with the image.

The motion score (see T2 in FIG. 3) of each type of motion is registered in the motion score database 42. The motion score corresponding to the type of detected motion can be acquired by referring to the motion score database 42.

The output unit 5 outputs information generated by the controller 3. Specifically, the output unit 5 outputs the result score that is of the expression estimation result generated by the controller 3. In the first embodiment, by way of example, the output unit 5 is a display device that outputs the expression estimation result as the image. There is no particular limitation to an output mode and an output destination of the expression estimation result. For example, the output unit 5 may be a communication device that transmits the expression estimation result to another device.

The controller 3 integrally controls a function of the expression estimation device 1, and includes a face detector 31, a face score acquisition unit (expression determination unit) 32, a motion detector (motion determination unit) 33, a motion score acquisition unit 34, and an expression decision unit (expression estimation unit) 35.

The face detector 31 receives the image acquired by the image acquisition unit 2, and detects the face of the person included in the image. The face can be detected from the image by a well-known technology. For example, the face is detected by analyzing whether a typical pattern of the person's face is included in the image. There is no limitation to the face detection method, but any face detection method can be applied to one or more embodiments of the present invention.

The face score acquisition unit 32 analyzes a face portion (face image), which is detected by the face detector 31 in the image acquired by the image acquisition unit 2, and generates the information indicating the expression of the person having the face. Using a well-known-technology, the face image can be analyzed to generate the information indicating the expression. There is no particular limitation to the information generated by the face score acquisition unit 32 as long as the information indicates the expression of the person. In the first embodiment, the face score (see T1 in FIG. 3) is generated by way of example. Specifically, the face score acquisition unit 32 compares the face image to the image constituting the model of the expression of each expression category registered in the face score database 41, and generates the face score by calculating the score corresponding to the fitness.

The motion detector 33 analyzes the image acquired by the image acquisition unit 2, detects the motion of the person in the image, and determines the type of motion. The motion score of the motion that becomes the detection target of the motion detector 33 is registered in the motion score database 42. The predetermined motion of the person in the image can be detected by a well-known technology. For example, in the case that the model image of the motion is registered in the motion score database 42, the motion registered in the motion score database 42 may be detected by comparing the model image to the image acquired by the image acquisition unit 2.

The motion score acquisition unit 34 acquires the motion score corresponding to the type of motion detected by the motion detector 33 from the motion score database 42. As described above, the motion score is correction information correcting the face score, and the motion score has a previously-set value in each type of motion (see T2 in FIG. 3).

The expression decision unit 35 generates the information indicating the expression of the person in the image according to the face score generated by the face score acquisition unit 32 and the type of motion determined by the motion detector 33. Specifically, the expression decision unit 35 adds the face score generated by the face score acquisition unit 32 and the motion score (acquired by the motion score acquisition unit 34) corresponding to the type of motion determined by the motion detector 33 in each expression category, and generates the result score indicating the expression of the person in the image. The expression decision unit 35 outputs the result score to the output unit 5.

Figure 5:
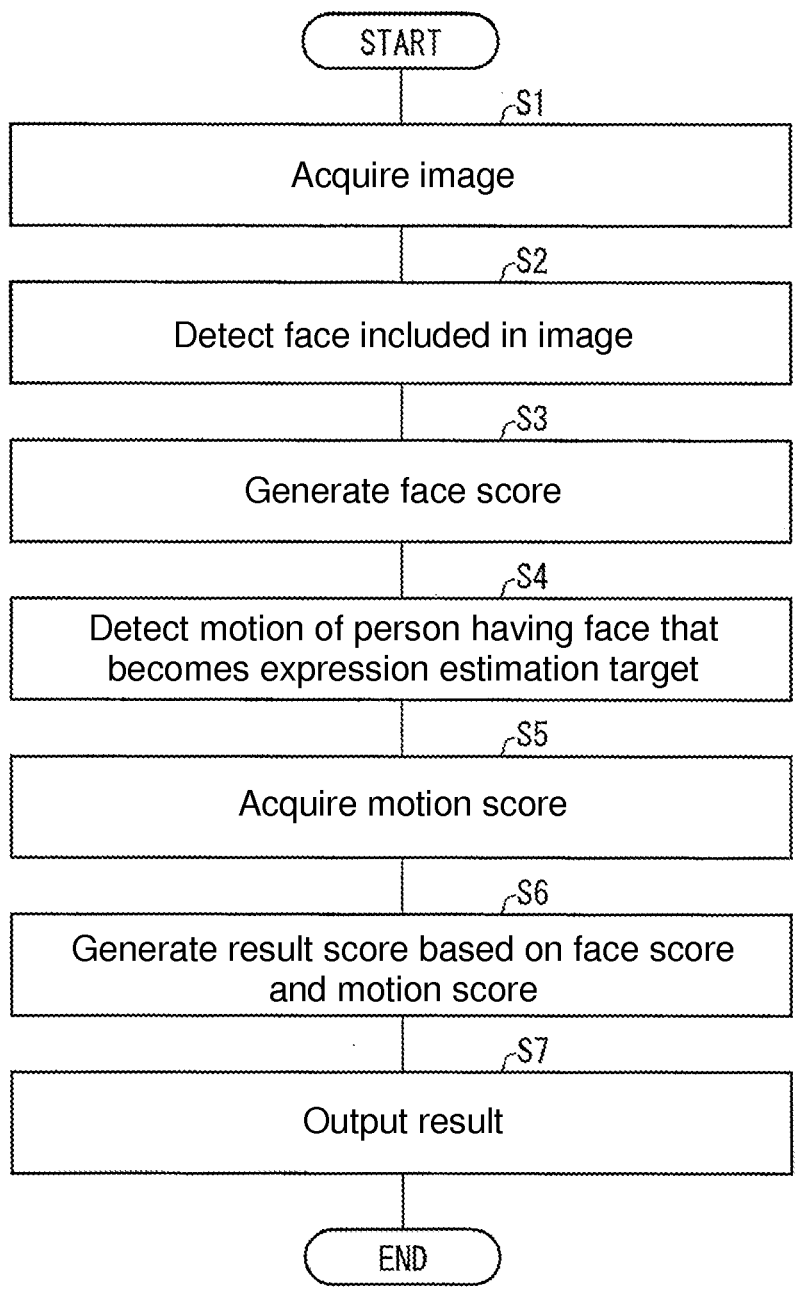
FIG. 5 is a flowchart illustrating an example of processing performed by the expression estimation device.

A flow of processing performed by the expression estimation device 1 will be described with reference to FIG. 5. FIG. 5 is a flowchart illustrating an example of the processing performed by the expression estimation device 1 (a control method for the expression estimation device 1).

The image acquisition unit 2 acquires the person image (S1), and outputs the image to the face detector 31. The face detector 31 detects the face included in the image output from the image acquisition unit 2 (S2). For example, in FIGS. 2A-2B, the input of the image in FIG. 2A is received, and the face image F1 in FIG. 2B is detected from the image.

The face score acquisition unit 32 generates the face score by analyzing the image of the face portion detected by the face detector 31 (S3, the expression determination step). The face score acquisition unit 32 notifies the expression decision unit 35 of the face score, and notifies the motion detector 33 of the information (for example, a coordinate indicating a position of the person in the image) indicating the person whose face score is generated. The motion detector 33 detects the motion of the person of which the motion detector 33 is notified by the face score acquisition unit 32, namely, the person having the face that becomes the expression estimation target (S4, the motion determination step), and the motion detector 33 notifies the motion score acquisition unit 34 of the type of detected motion. The motion score acquisition unit 34 acquires the motion score corresponding to the notified type of motion from the motion score database 42 (S5), and notifies the expression decision unit 35 of the motion score. For example, in FIGS. 2A-2B, the motion A1 of the folded arms in FIG. 2B is detected, the motion score T2 in FIG. 3 corresponding to the motion of the folded arms is acquired, and the expression decision unit 35 is notified of the motion score T2.

The expression decision unit 35 adds the motion score of which the expression decision unit 35 is notified by the motion score acquisition unit 34 to the face score of which the expression decision unit 35 is notified by the face score acquisition unit 32, generates the result score (S6, the expression estimation step), transmits the result score to the output unit 5, and causes the output unit 5 to output the result score (S7). Then the processing is ended.

Second Embodiment

Figure 6:
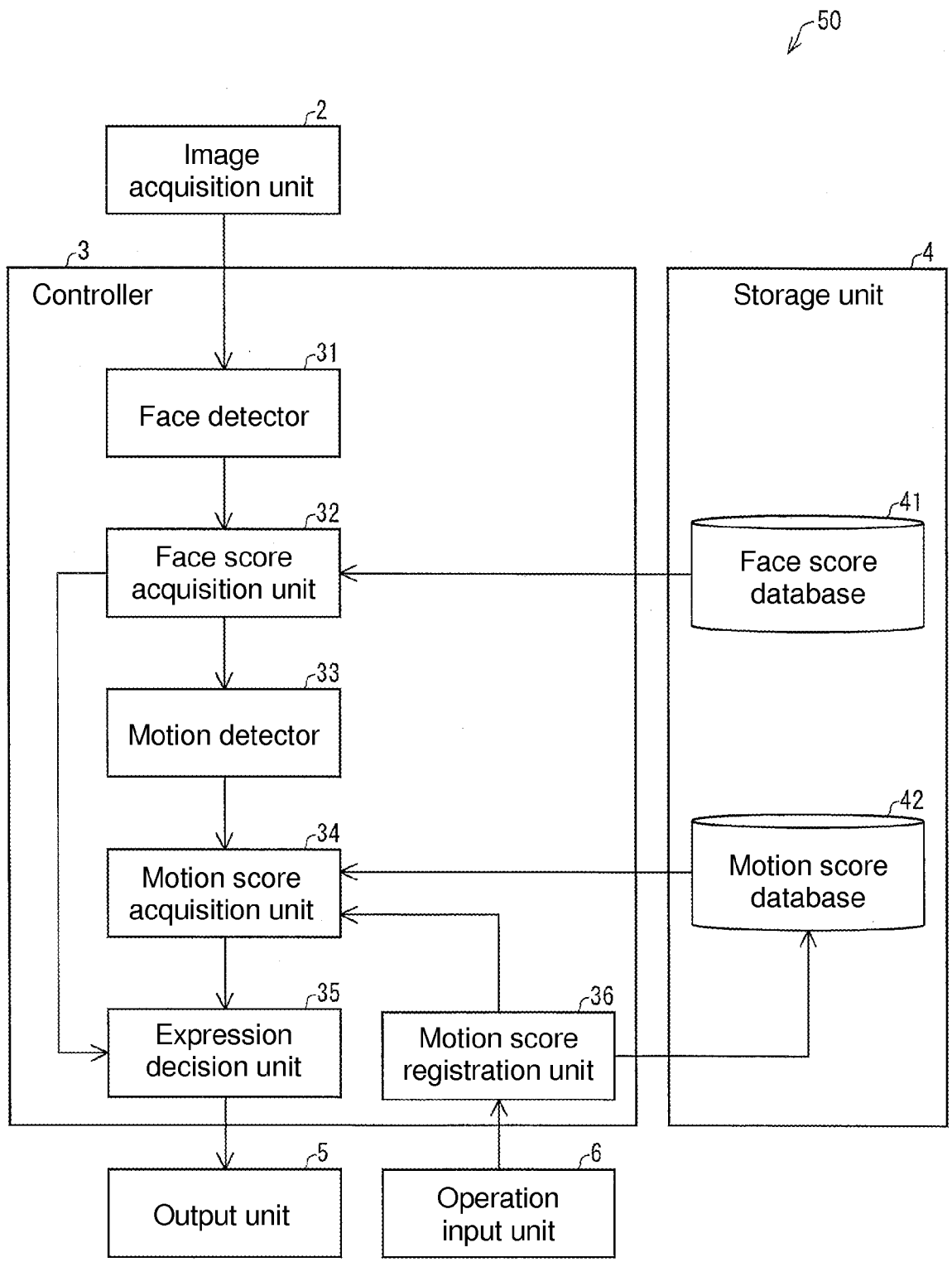
FIG. 6 is a block diagram illustrating an example of a main-part configuration of an expression estimation device according to a second embodiment of the present invention.

A second embodiment of the present invention will be described below with reference to FIGS. 6 to 8. In the second embodiment, the motion score registration performed by the user is received in order to enable the expression estimation can be estimated using the motion score corresponding to any motion. Similar configuration as the first embodiment is designated by the same reference numeral, and the description is omitted.

The configuration of the expression estimation device of the second embodiment will be described with reference to FIG. 6. FIG. 6 is a block diagram illustrating an example of a main-part configuration of an expression estimation device 50 of the second embodiment. The expression estimation device 50 differs from the expression estimation device 1 in that the expression estimation device 50 includes an operation input unit 6 and a motion score registration unit (motion registration unit) 36.

The operation input unit 6 is a user interface that receives an input operation of the user to notify the controller 3. In the second embodiment, by way of example, the output unit 5 is the display device that displays the image, and the operation input unit 6 is a touch sensor that detects a contact with the image on a display surface as the input operation. That is, the expression estimation device 50 includes a touch panel, the expression estimation result is displayed on the touch panel, and the touch operation of the user is received on the touch panel. There is no limitation to the operation input unit 6 as long as the operation input unit 6 can receive the input operation of the user.

The motion score registration unit 36 stores the motion assigned in the image while correlating the type of motion with the correction information on the motion with each other. Specifically, the motion score registration unit 36 registers the motion, which is assigned by the user using the operation input unit 6, in the motion score database 42 while correlating the information used to detect the motion from the image (for example, the image of the motion) with the motion score corresponding to the motion.

A registration example of the motion score will be described below with reference to FIG. 7. FIG. 7 is a view illustrating an example in which the motion of the "clenched fist" is registered. First, the assignment of the motion that becomes a registration target is received in the case that the motion score is registered. For example, the person image may be displayed on the touch panel to receive the touch operation performed to the portion in which the motion that becomes the registration target emerges, or the assignment of the motion that becomes the registration target may be received by receiving the touch operation in which a locus is drawn so as to surround the portion.

Figure 7:
FIG. 7 is a view illustrating an example in which the motion of a "clenched fist" is registered.

In the example in FIG. 7, it is assumed that a portion A7 of the "clenched fist" is selected from the displayed image. When the portion corresponding to the motion is selected from the image, the motion score registration unit 36 decides to register the portion in the motion score database 42.

Then the motion score registration unit 36 receives the registration of the motion score of the motion. In registering the motion score, the motion score to be registered may be received in the form of the numerical value, or the motion score may be received in three stages like the example of T4 in FIG. 7. In the example of T4, one of a circle, a triangle, and a cross is selected with respect to each expression category. Therefore, without inputting the detailed numerical value, the user can intuitively set the circle to the expression category considered to be correlated with the motion, set the triangle to the expression category considered to be slightly correlated with the motion, and set the cross to the expression category entirely unrelated to the motion. In order that the stage can be added to the face score in the case that the selection is received, the stage is converted into a predetermined value, for example, circle=+20, triangle=+10, and cross=−10, and registered in the motion score database 42 together with the image of the motion.

A flow of the processing performed by the expression estimation device 50 will be described below with reference to FIG. 8. FIG. 8 is a flowchart illustrating an example of the processing performed by the expression estimation device 50 (the control method of the expression estimation device 50). Because the pieces of processing in S11 to S13 and S15 to S17 of FIG. 8 are similar to those in S1 to S3 and S5 to S7 of FIG. 5, the detailed description is omitted.

In S14, the motion detector 33 determines whether the motion of the person corresponding to the portion recognized as the face by the face detector 31 in S12 is detected in the image acquired by the image acquisition unit 2 in S11. When the motion of the person is detected (YES in S14), the motion detector 33 notifies the motion score acquisition unit 34 of the type of detected motion, and the result score is output through the pieces of processing in S15 to S17.

On the other hand, when the motion of the person is not detected (NO in S14), the motion detector 33 notifies the motion score registration unit 36 that the motion of the person is not detected. The motion score registration unit 36 that receives the notification displays a screen on which the assignment of the motion is received. The motion score registration unit 36 may display a message that encourages the user to assign the motion while displaying the image in which the face is detected. The assignment of the motion that becomes the registration target is received through the operation input unit 6 (S18).

Then the motion score registration unit 36 displays the screen on which the assignment of the score is received. For example, the motion score registration unit 36 may display the message that encourages the user to assign the score for each expression category while displaying each expression category. The motion score in which the score assigned through the operation input unit 6 is correlated with the image of the motion assigned in S18 is generated and registered in motion score database 42 (S19).

The motion score registration unit 36 notifies the motion score acquisition unit 34 of the motion score. Therefore, the motion score acquisition unit 34 notifies the expression decision unit 35 of the motion score, the expression decision unit 35 specifies the expression based on the motion score and the face score generated by the face score acquisition unit (S16, the expression estimation step), and outputs the specified result (S17). Then the processing is ended.

Figure 8:
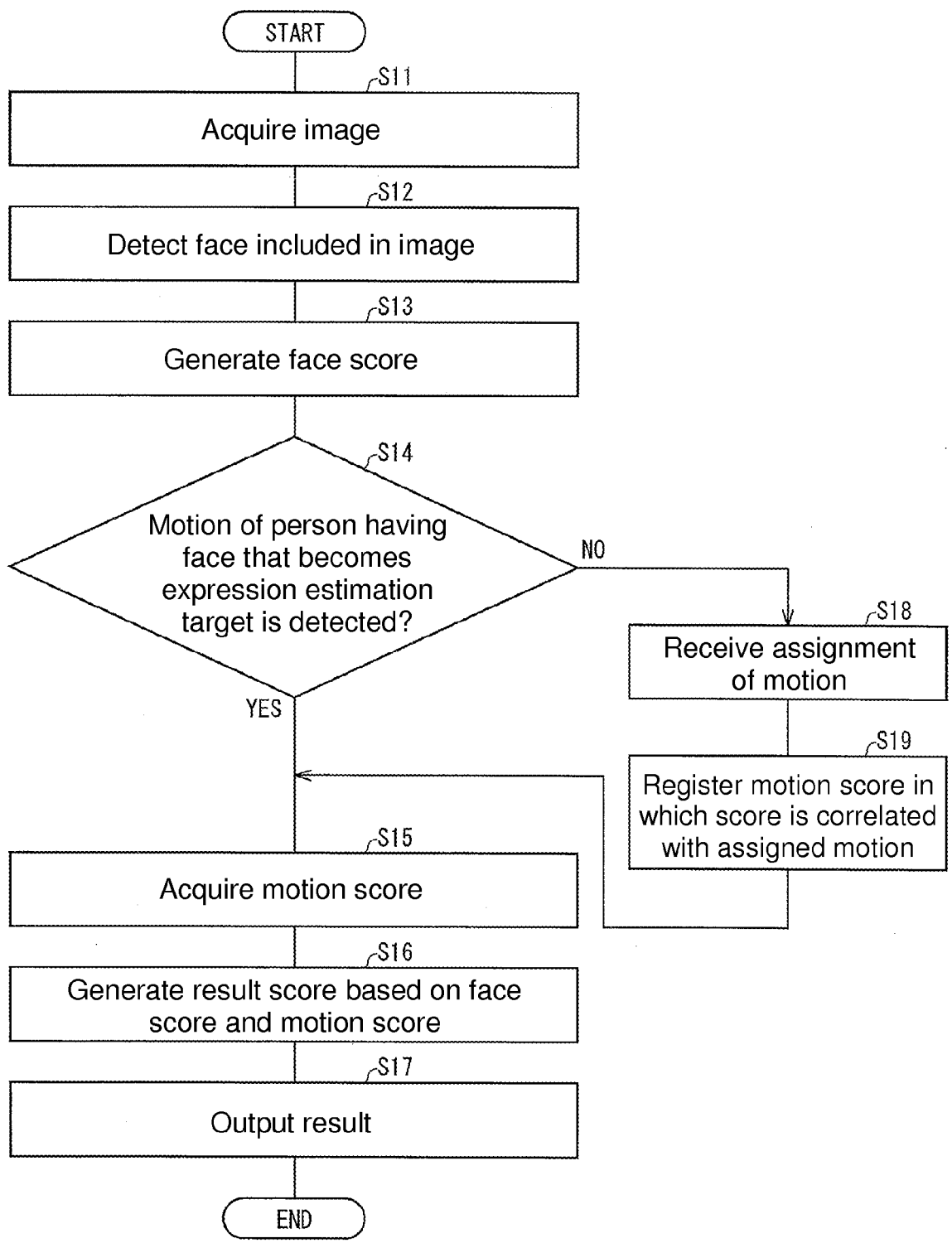
FIG. 8 is a flowchart illustrating an example of the processing performed by the expression estimation device.

Through the pieces of processing in FIG. 8, even if the motion of the person in the image cannot be detected, the expression estimation can be performed in consideration of the motion by registering the motion of the person. The motion score registered in the above way is also used in the subsequent expression estimation, so that the estimation accuracy of the expression estimation device 50 can be enhanced.

Third Embodiment

A third embodiment of the present invention will be described below with reference to FIGS. 9 to 12. In the third embodiment, the person in the image is identified, and the expression is estimated using the motion score corresponding to the identified person. Similar configuration as the first and second embodiments are designated by the same reference numeral, and the description is omitted.

Figure 9:
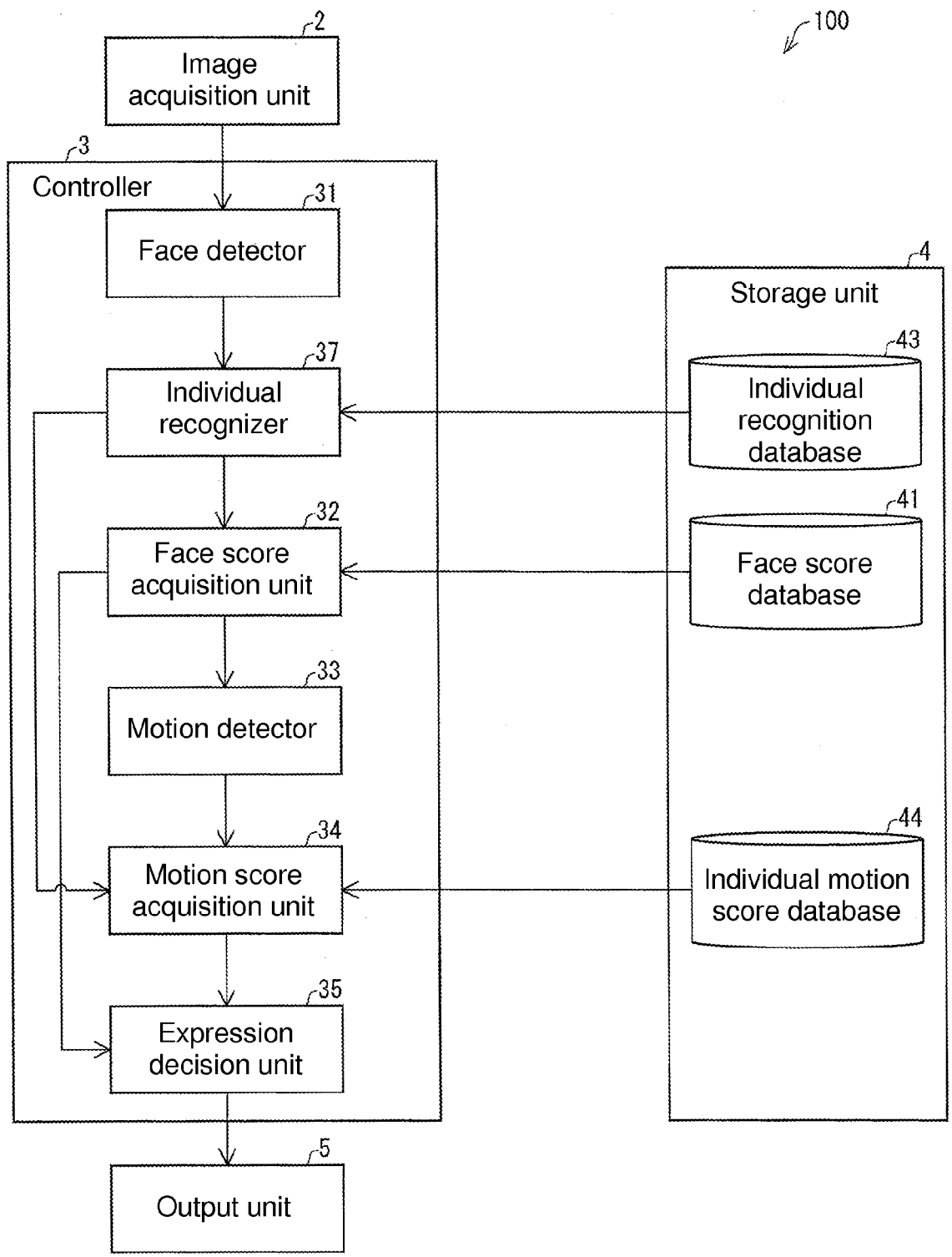
FIG. 9 is a block diagram illustrating a main-part configuration of an expression estimation device according to a third embodiment of the present invention.

The configuration of the expression estimation device of the third embodiment will be described with reference to FIG. 9. FIG. 9 is a block diagram illustrating a main-part configuration of an expression estimation device 100 of the third embodiment. The expression estimation device 100 differs from the expression estimation device 1 in that the expression estimation device 100 includes an individual recognizer (attribute determination unit) 37 and that an individual recognition database 43 and an individual motion score database 44 are stored.

The individual recognizer 37 identifies the person in the image. More particularly, the individual recognizer 37 analyzes the image to determine which person registered in the individual recognition database 43 corresponds to the person in the image, thereby identifying the person in the image.

As described above, the individual recognition database 43 is used such that the individual recognizer 37 identifies the person in the image. In the individual recognition database 43, identification information (such as a name) on the person is correlated with the image of the person.

The individual motion score is registered in the individual motion score database 44. Using the individual motion score database 44, the motion score can be specified according to an individual recognition result of the individual recognizer 37. The expression is corrected according to an individual characteristic using the individual motion score, so that the accuracy of the expression estimation can further be enhanced. This is because, even in the same motion, the cause of the motion may depend on the person.

For example, the motion score in FIG. 10 is registered in the individual motion score database 44. FIG. 10 is a view illustrating an example of the individually-set motion score. FIG. 10 illustrates a motion score T5 corresponding to the motion of the "folded arms" of Mr./Ms. A and a motion score T6 corresponding to the motion of the "folded arms" of Mr./Ms. B. In the example in FIG. 10, a positive correction of the "anger" is largely set in the "folded arms" of Mr./Ms. A, and the positive correction of the "fear" is largely set in the "folded arms" of Mr./Ms. B. Therefore, even if the same "folded arms" is detected, the correction is performed based on whether the person is Mr./Ms. A or Mr./Ms. B, so that the accuracy of the expression estimation can be enhanced.

Figure 11:
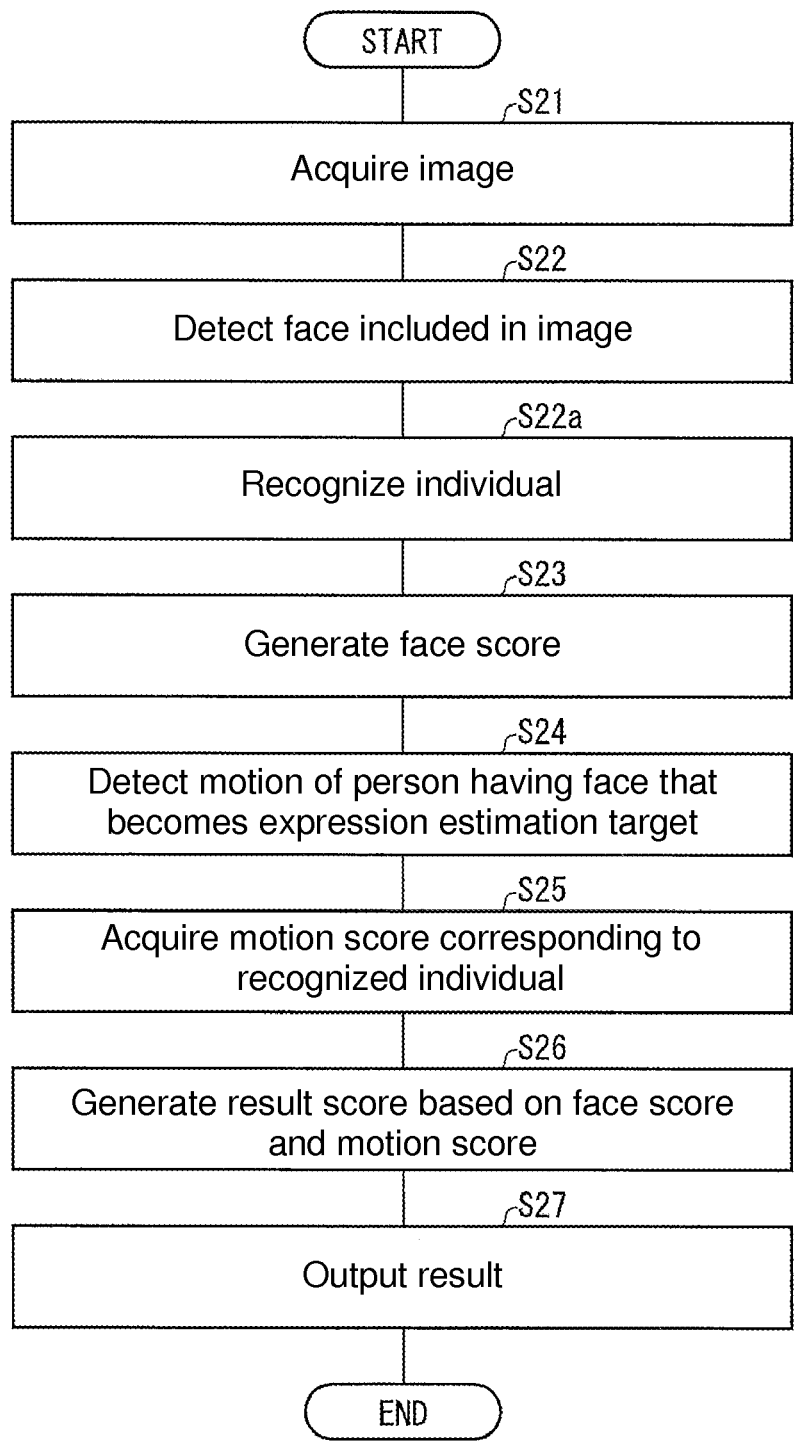
FIG. 11 is a flowchart illustrating an example of the processing performed by the expression estimation device.

What kind of feeling is indicated by the motion is hardly determined by persons except the person who performs the motion and a close relative of the person. Therefore, in the motion score registered in the individual motion score database 44, according to one or more embodiments of the present invention, the addition and the update can be performed by the user of the expression estimation device 100. In adding or updating the motion score, the numerical input in FIG. 10 may be received and registered. Alternatively, the stepwise input like the example in FIG. 7 may be received in order to reduce an input burden on the user. A flow of the processing performed by the expression estimation device 100 will be described below with reference to FIG. 11. FIG. 11 is a flowchart illustrating an example of the processing performed by the expression estimation device 100 (the control method of the expression estimation device 100). Because the pieces of processing in S21 to S24, S26, and S27 of FIG. 11 are identical to those in S1 to S4, S6, and S7 of FIG. 5, the detailed description is omitted.

In S22a, the individual recognizer 37 refers to the individual recognition database 43 to recognize the person (individual) corresponding to the portion (face image) recognized as the face by the face detector 31 in S22 in the image acquired by the image acquisition unit 2 in S21. The individual recognizer 37 notifies the motion score acquisition unit 34 of the recognized person. Then the face score acquisition unit 32 generates the face score from the face image (S23, the expression determination step), and the motion detector 33 detects the motion (S24, the motion determination step).

In S25, the motion score acquisition unit 34 acquires the motion score of the person, of which the motion score acquisition unit 34 is notified by the individual recognizer 37 in the motion score corresponding to the motion detected by the motion detector 33 in S24, from the individual motion score database 44. The motion score acquisition unit 34 notifies the expression decision unit 35 of the acquired motion score, and the expression decision unit 35 generates the result score based on the motion score and the face score generated by the face score acquisition unit (S26, the expression estimation step) and outputs the result score (S27). Then the processing is ended.

Figures 12, 13:
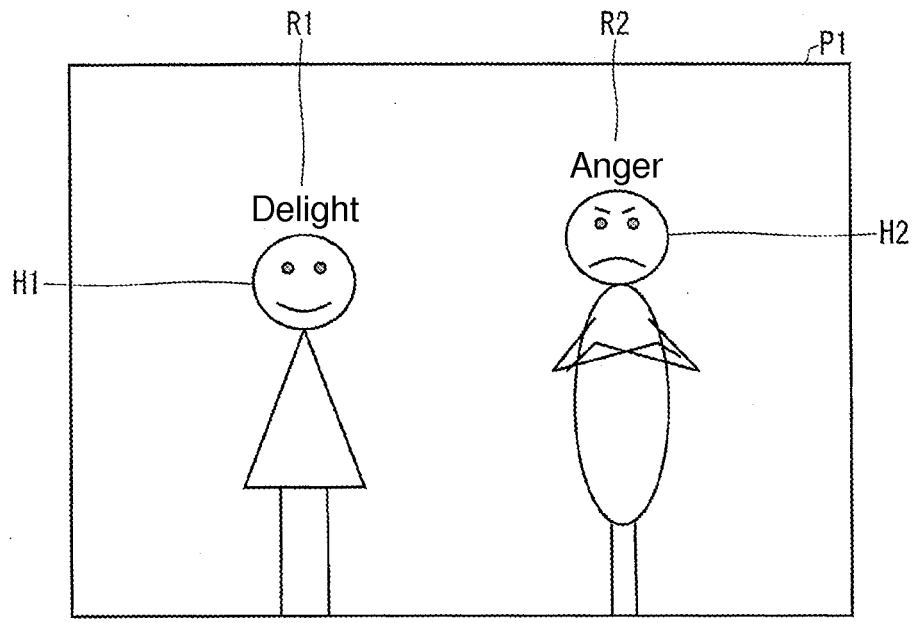
FIG. 12 is a view illustrating an example in which an expression estimation result is displayed while overlapped with a person image.
FIG. 13 is a view illustrating an example of a person attribute dependent motion score used by an expression estimation device according to a fourth embodiment of the present invention.

An example of the result output will be described with reference to FIG. 12. FIG. 12 is a view illustrating an example in which the expression estimation result is displayed while overlapped with the person image. An image P1 in FIG. 12 includes two persons H1 and H2. An expression R1 is displayed while correlated with the person H1, and an expression R2 is displayed while correlated with the person H2.

The result score is not directly displayed, but one expression specified from the result score may be output while correlated with the person who becomes the estimation target. Therefore, the user can extremely easily recognize the expression estimation result.

Fourth Embodiment

Figure 14:
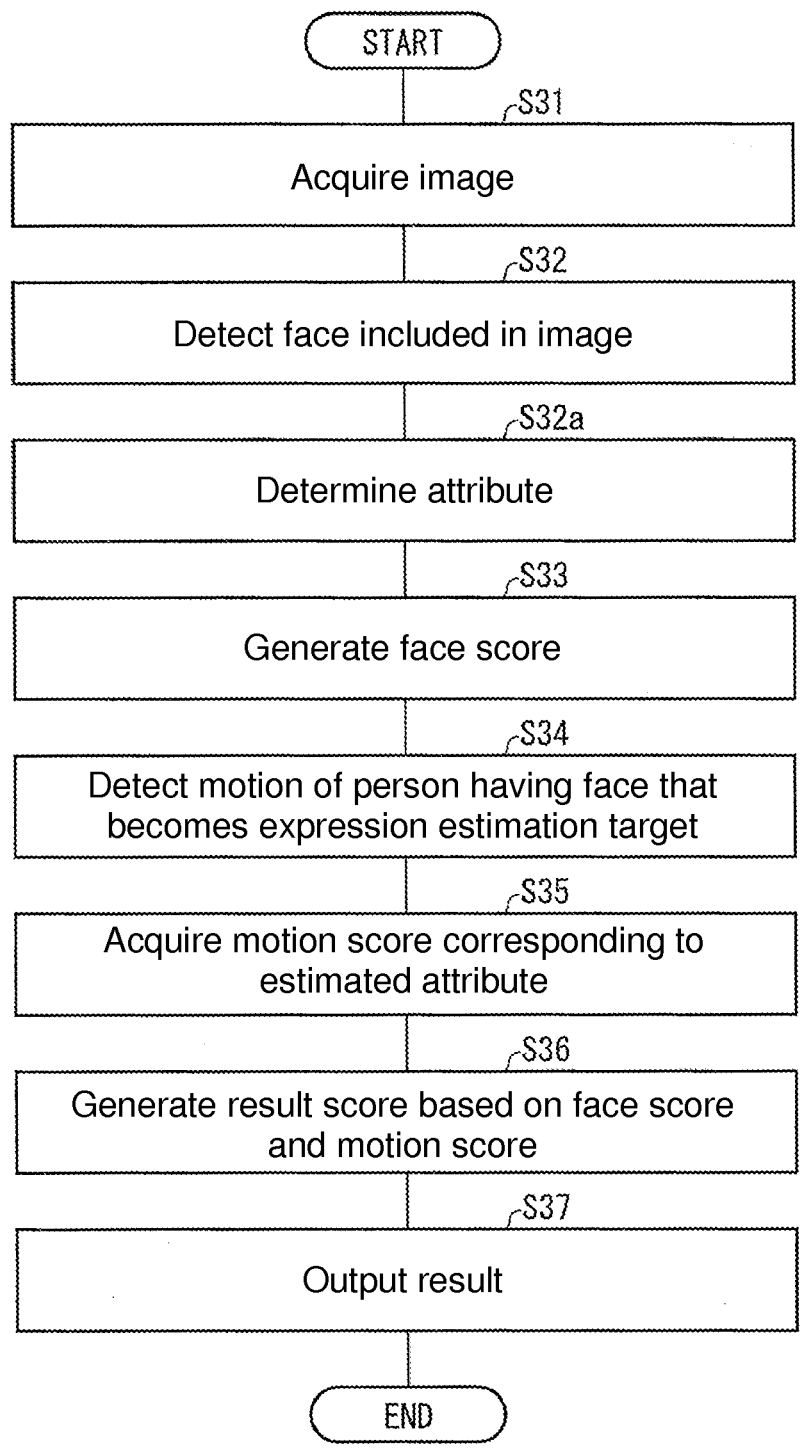
FIG. 14 is a flowchart illustrating an example of the processing performed by the expression estimation device.

A fourth embodiment of the present invention will be described below with reference to FIGS. 13 and 14. In the fourth embodiment, an attribute of the person in the image is determined, and the expression is estimated using the motion score corresponding to the determined attribute. Similar configurations as the first to third embodiments are designated by the same reference numeral, and the description is omitted.

Because the expression estimation device of the fourth embodiment is substantially identical to the expression estimation device 100 of the third embodiment, the expression estimation device of the fourth embodiment will be described with reference to FIG. 9. The expression estimation device of the fourth embodiment differs from the expression estimation device 100 in that the individual recognizer 37 determines the attribute and that the motion score acquisition unit 34 acquires the motion score according to the attribute. Therefore, the information determining which predetermined attribute corresponds to the person in the image is stored in the individual recognition database 43, and the motion score of each attribute is stored in the individual motion score database 44.

Any attribute may be used as long as the attribute indicates the feature or characteristic of the person. Examples of the attributes include an age, an age group (such a bundle as child and adult may be used), and sex. A combination of the attributes such as an "adult man" may be dealt with as one attribute. In the fourth embodiment, it is also said that the attribute that is of the specific individual is determined. The attribute can be determined by the well-known image analysis.

The feeling that emerges in action depends on the attribute such as the age and the sex, so that the accuracy of the expression estimation can further be enhanced using the motion score corresponding to the attribute. For example, in the case it is assumed that frequently the "folded arms" of the adult indicates the anger and that the "folded arms" of the child indicates the fear, the motion score having the largely positive correction of the "anger" may be used in the person in which the attribute is the "adult", and the motion score having the largely positive correction of the "fear" may be used in the person in which the attribute is the "child". Therefore, the accuracy of the expression estimation can be enhanced.

For example, the motion score in FIG. 13 is registered in the individual motion score database 44 of the fourth embodiment. FIG. 13 is a view illustrating an example of a person attribute dependent motion score. FIG. 13 illustrates a motion score T7 corresponding to the motion of the "folded arms" of a woman in her thirties and a motion score T8 corresponding to the motion of the "folded arms" of a woman of 3 to 10 years old. In the example in FIG. 13, the positive correction of the "anger" is largely set to the "folded arms" of the woman in her thirties, and the positive correction of the "fear" is largely set to the "folded arms" of the woman of 3 to 10 years old. Therefore, even if the same "folded arms" is detected, the correction is performed according to the age of the woman, namely, the woman in her thirties or the woman of 3 to 10 years old, so that the accuracy of the expression estimation can be enhanced.

A flow of the processing performed by the expression estimation device of the fourth embodiment will be described below with reference to FIG. 14. FIG. 14 is a flowchart illustrating an example of the processing performed by the expression estimation device in which the attribute dependent motion score is used (the control method for the expression estimation device 100). Because the pieces of processing in S31, S32, S33, S34, S36, and S37 of FIG. 14 are identical to those in S21, S22, S23, S24, S26, and S27 of FIG. 11, the detailed description is omitted.

In S32a, the individual recognizer 37 refers to the individual recognition database 43 to determine the attribute of the person in which the face is detected by the face detector 31 in S32 in the image acquired by the image acquisition unit 2 in S31. The individual recognizer 37 notified the motion score acquisition unit 34 of the determined attribute. Then, the face score acquisition unit 32 generates the face score (S33, the expression determination step), and the motion detector 33 detects the motion (S34, the motion determination step).

In S35, the motion score acquisition unit 34 acquires the motion score corresponding to the attribute of which the motion score acquisition unit 34 is notified by the individual recognizer 37 in the motion score corresponding to the motion detected by the motion detector 33 in S34 from the individual motion score database 44. The motion score acquisition unit 34 notifies the expression decision unit 35 of the acquired motion score, and the expression decision unit 35 generates the result score based on the motion score and the face score generated by the face score acquisition unit (S36, the expression estimation step), and outputs the specified result (S37). Then the processing is ended. In the fourth embodiment, the motion score corresponding to the determined attribute is used by way of example. Alternatively, the face score corresponding to the determined attribute may be used.

Fifth Embodiment

A fifth embodiment of the present invention will be described below with reference to FIGS. 15 to 18. In the fifth embodiment, whether there is necessity to consider the motion in the expression estimation is determined, and the motion is detected only in the case of the determination that there is the necessity to consider the motion. Similar configurations as the first to fourth embodiments are designated by the same reference numeral, and the description is omitted.

Figure 15:
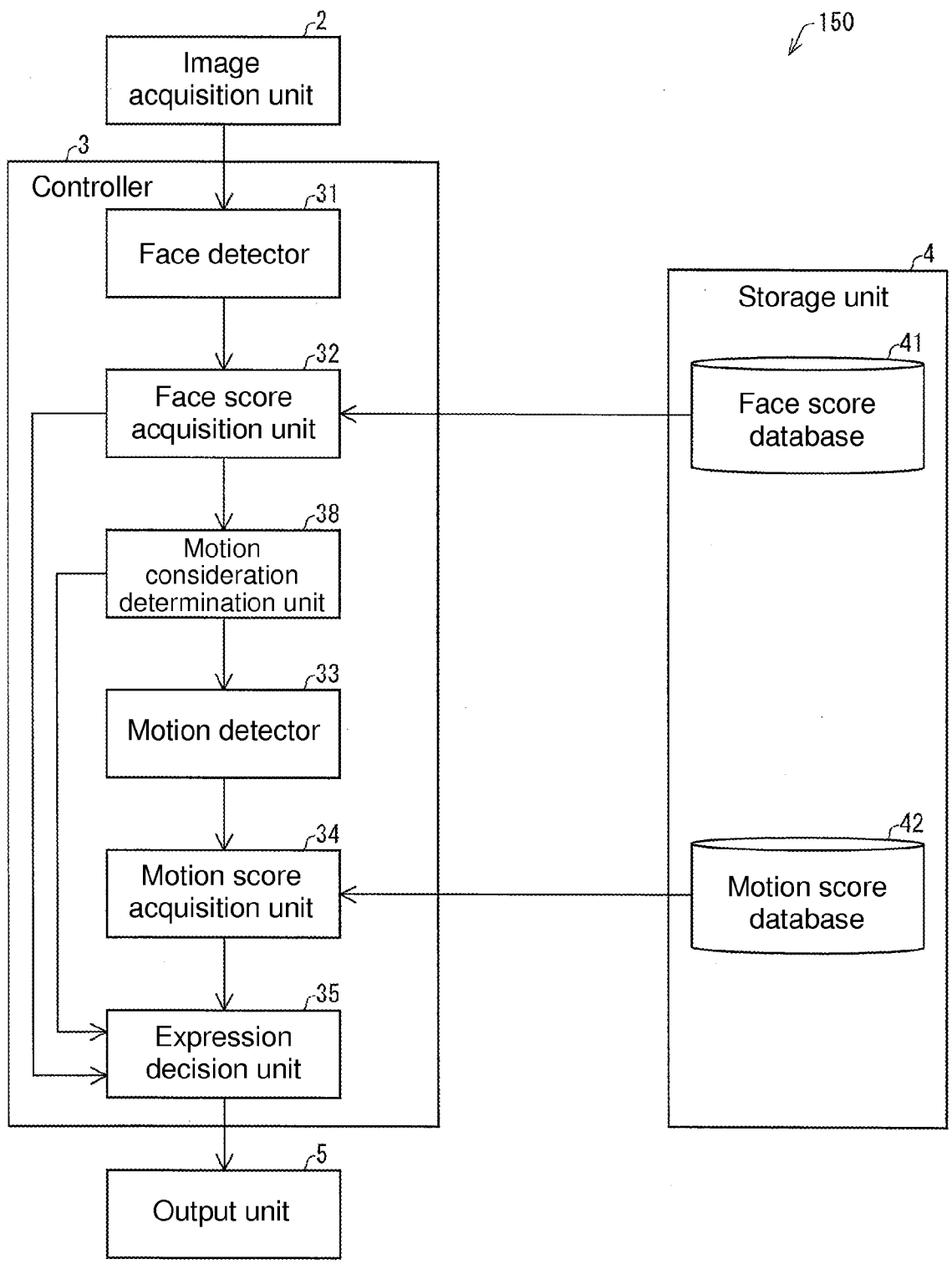
FIG. 15 is a block diagram illustrating an example of a main-part configuration of an expression estimation device according to a fifth embodiment of the present invention.

The configuration of the expression estimation device of the fifth embodiment will be described below with reference to FIG. 15. FIG. 15 is a block diagram illustrating an example of a main-part configuration of an expression estimation device 150 of the fifth embodiment. The expression estimation device 150 differs from the expression estimation device 1 of the first embodiment in that the expression estimation device 150 includes a motion consideration determination unit (fitness proximity determination unit, fit expression determination unit) 38 that determines whether there is the necessity to consider the motion in the expression estimation based on the face score generated by the face score acquisition unit 32.

Figure 16:
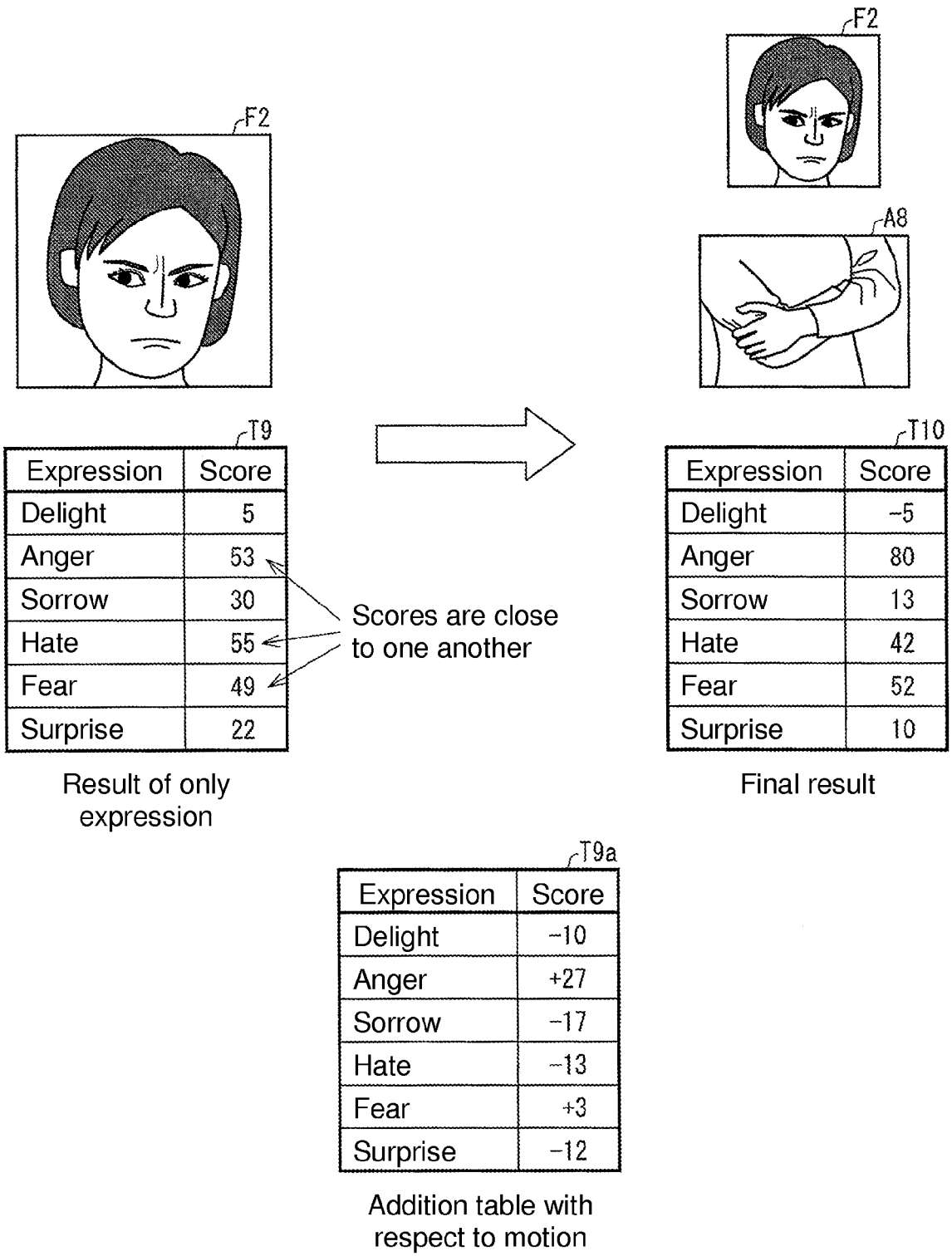
FIG. 16 is a view illustrating an example when the expression estimation device determines that there is a necessity to consider the motion based on a face score.

The detailed determination whether there is the necessity to consider the motion will be described with reference to FIGS. 16 and 17. FIG. 16 is a view illustrating an example when the expression estimation device 150 determines that there is the necessity to consider the motion based on the face score, and FIG. 17 is a view illustrating an example when the expression estimation device 150 determines that there is no necessity to consider the motion based on the face score.

In the example in FIG. 16, a face score T9 is generated from a face image F2 detected from the acquired image. In the face score T9, the top three scores are close to one another. In this case, it is difficult to specify which one of the three scores is best fit to the feeling of the person only from the face score T9.

Therefore, in this case, the motion consideration determination unit 38 determines that there is the necessity to consider the motion. Specifically, the motion consideration determination unit 38 (fitness proximity determination unit) determines that there is the necessity to consider the motion in the case that a difference between the largest value and the second largest value of the score is less than a predetermined upper limit. Therefore, because the expression is decided in consideration of a motion score T9a, the difference between the scores close to each other is clarified as illustrated in T10 of FIG. 16, and the expression fit to the feeling of the person can be specified.

Figure 17:
FIG. 17 is a view illustrating an example when the expression estimation device determines that there is no necessity to consider the motion based on the face score.

On the other hand, in a face score T11 in FIG. 17, the score has the largest value of 80 (anger) and the second largest value of 55 (hate), and the difference between the largest value and the second largest value is large. Therefore, the expression is estimated to be the "anger" without consideration of the motion.

In such cases (in the case that the difference between the largest value and the second largest value is greater than or equal to the predetermined upper limit), the motion consideration determination unit 38 determines that there is no necessity to consider the motion. The face score generated by the face score acquisition unit 32 is output as a final result T12 without performing the detection of the motion, the acquisition of the motion score, and the pieces of arithmetic processing in which the face score and the motion score are used.

Figure 18:
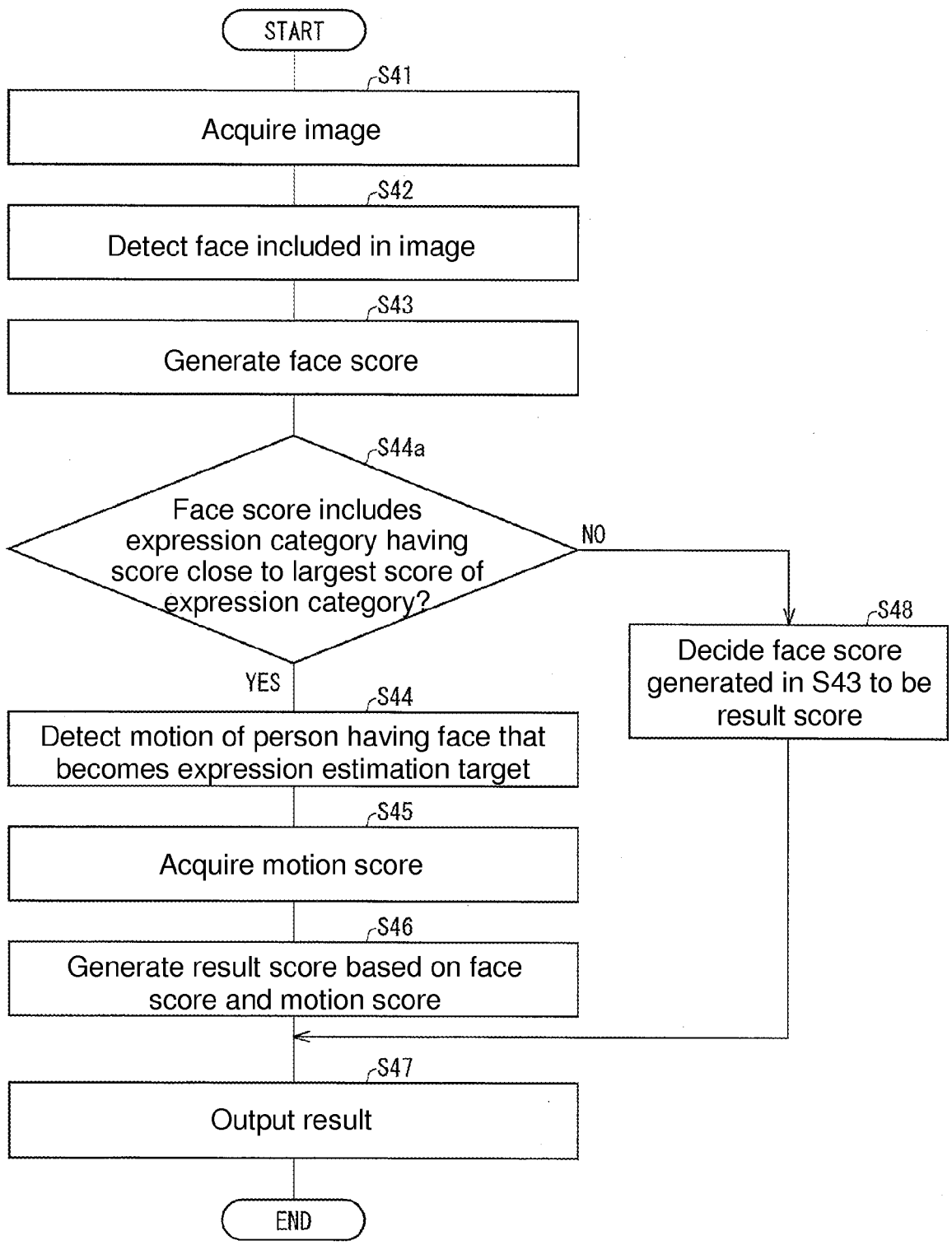
FIG. 18 is a flowchart illustrating an example of the processing performed by the expression estimation device.

A flow of the processing performed by the expression estimation device 150 will be described below with reference to FIG. 18. FIG. 18 is a flowchart illustrating an example of the processing (the control method of the expression estimation device 150) performed by the expression estimation device 150 that determines whether the necessity to consider the motion exists in the expression estimation. Because the pieces of processing in S41, S42, and S44 to S47 of FIG. 18 are identical to those in S1, S2, and S4 to S7 of FIG. 5, the detailed description is omitted.

In S43, the face score acquisition unit 32 generates the face score, and notifies the motion consideration determination unit 38 and the expression decision unit 35 of the face score. In S44a, the motion consideration determination unit 38 (fitness proximity determination unit) determines whether the face score includes the expression category having the score close to the largest score of the expression category. More specifically, the motion consideration determination unit 38 determines whether the difference between the largest value and the second largest value of the score is less than the predetermined upper limit.

When the difference between the largest value and the second largest value of the score is determined to be less than the predetermined upper limit (YES in S44a), the motion consideration determination unit 38 issues an instruction to the motion detector 33 to detect the motion. Therefore, the pieces of processing in S44 to S46 are performed, and the expression estimation result calculated using the face score and the motion score is output in S47 (see FIG. 16). Because the motion score is considered in order to generate the difference between the scores close to each other, the motion score may be added to the face score with respect to only the expression category of the largest face score and the expression category of the face score close to the largest face score (in the example in FIG. 16, the "hate" having the largest score and the "anger" and "fear" having the scores close to the score of the "hate") in S46. Therefore, a calculation amount can be reduced compared with the case that the calculation is performed to all the scores.

On the other hand, when the difference between the largest value and the second largest value of the score is determined to be greater than or equal to the predetermined upper limit (NO in S44a), the motion consideration determination unit 38 notifies the expression decision unit 35 of no necessity to consider the motion. Therefore, the expression decision unit 35 decides the face score generated in S43 to be the expression estimation result (S48), and outputs the expression estimation result (S47) (see FIG. 17). When the difference is determined to be greater than or equal to the predetermined upper limit (NO in S44a), the motion consideration determination unit 38 may notify the motion detector 33 of no necessity to detect the motion.

Sixth Embodiment

A sixth embodiment of the present invention will be described below with reference to FIGS. 19 and 20. In the sixth embodiment, whether there is the necessity to consider the motion in the expression estimation is determined by another method. Because the configuration of the expression estimation device of the sixth embodiment is similar to that in FIG. 15, the configuration of the expression estimation device of the sixth embodiment will be described with reference to FIG. 15 in addition to FIGS. 19 and 20. Similar configurations as the first to fifth embodiments are designated by the same reference numeral, and the description is omitted.

The detailed determination whether there is the necessity to consider the motion in the sixth embodiment will be described with reference to FIG. 19. FIG. 19 illustrates an example of the case that the expression estimation device of the sixth embodiment determines that there is the necessity to consider the motion based on the expression category having the largest score and an example of the case that the expression estimation device determines that there is no necessity to consider the motion based on the expression category having the largest score.

Figure 19:
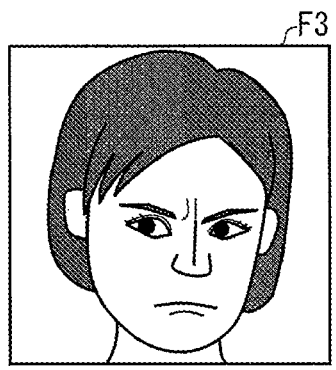
FIG. 19 illustrates an example of the case that an expression estimation device according to a sixth embodiment of the present invention determines that there is the necessity to consider the motion based on an expression category having the largest score and an example of the case that the expression estimation device determines that there is no necessity to consider the motion based on the expression category having the largest score.
Figure 19:
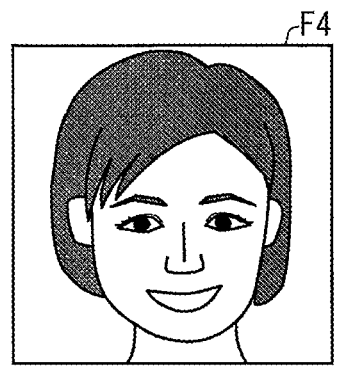
Figure 20:
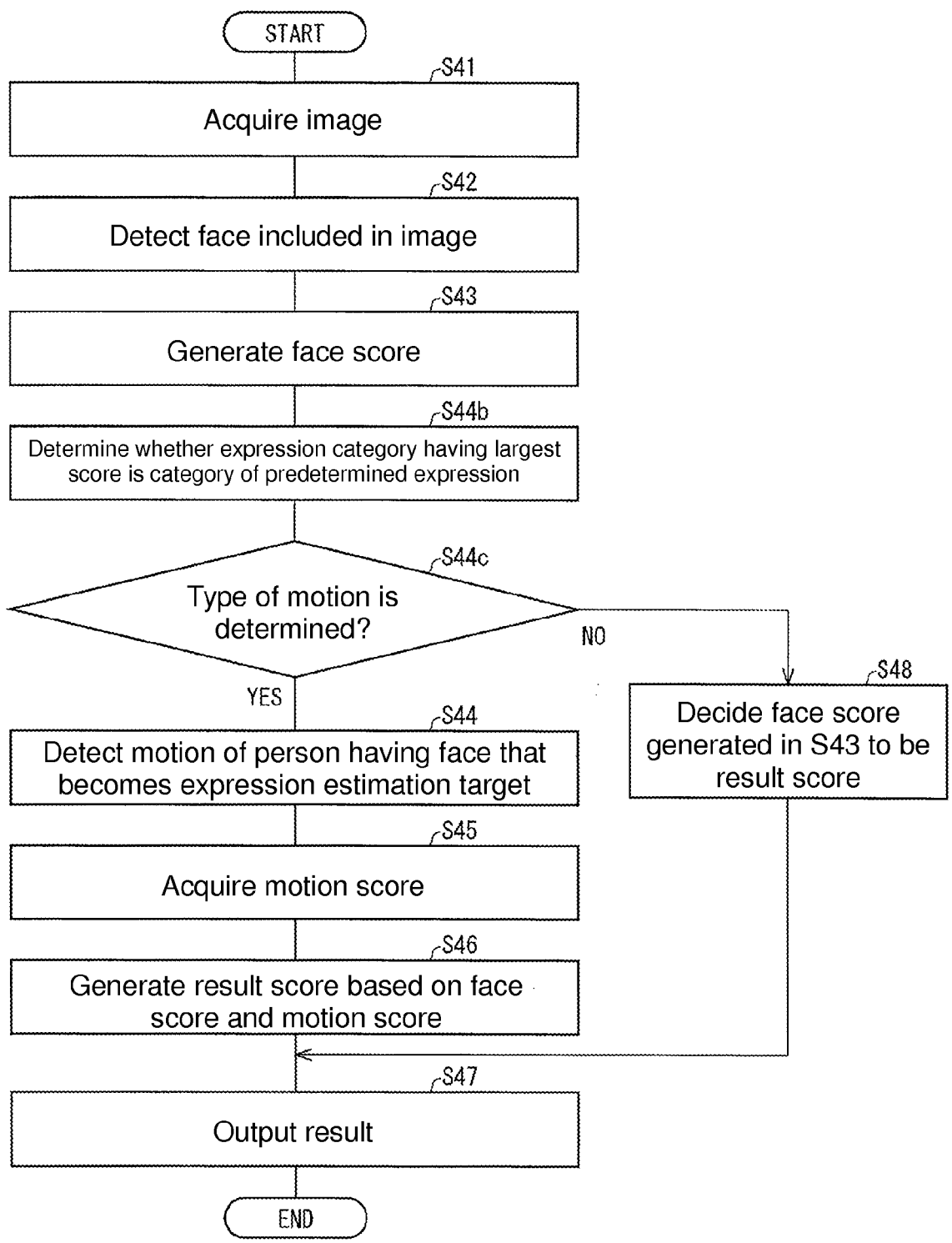
FIG. 20 is a flowchart illustrating an example of the processing performed by the expression estimation device.

FIG. 19 illustrates an example in which a face score T13 is generated from a face image F3. The expression category having the largest score is the "hate" in the face score T13. FIG. 19 also illustrates an example in which a face score T14 is generated from a face image F4. The expression category having the largest score is the "delight" in the face score T14.

When compared the face scores to each other, while the expression categories (anger and fear) having the scores close to that of the "hate" exist in the face score T13, the expression category having the score close to that of the "hate" does not exist in the face score T14. That is, sometimes the expression categories having the face score close to each other hardly emerge, and the one expression can easily be specified only from the face score, namely, the false estimation is hardly generated. On the other hand, like the face score T13, sometimes the expression categories having the face score close to each other easily emerge, and the one expression can hardly be specified only from the face score, namely, the false estimation is easily generated.

Therefore, the motion consideration determination unit 38 (fit expression determination unit) of the expression estimation device of the sixth embodiment determines whether one expression specified from the face score is a predetermined expression. Whether the type of motion is determined, namely, whether the expression is estimated in consideration of the motion is decided according to the determination result of the motion consideration determination unit 38. Specifically, the expression (for example, "delight") in which the false estimation is hardly generated is previously set as the predetermined expression. In this case, the type of motion is decided not to be determined in the case that the one expression specified from the face score is matched with the previously-set expression, and the type of motion is decided to be determined in the case that the one expression specified from the face score is not matched with the previously-set expression. The expression in which the false estimation is easily generated may previously be set as the predetermined expression. In this case, the type of motion is decided to be determined in the case that the one expression specified from the face score is matched with the previously-set expression, and the type of motion is decided not to be determined in the case that the one expression specified from the face score is not matched with the previously-set expression. For example, for the anger and hate, the fear and surprise, and the sorrow and confusion (the confusion is not illustrated in the examples of the drawings), the expressions are mistakable because the similar scores emerge easily. Therefore, the expressions may previously be set as the expression in which the false estimation is easily generated.

A flow of the processing performed by the expression estimation device of the sixth embodiment will be described below with reference to FIG. 20. FIG. 20 is a flowchart illustrating an example of the processing (the control method of the expression estimation device 150) performed by the expression estimation device that determines whether the necessity to consider the motion exists in the expression estimation based on the expression specified only from the face score. Because the pieces of processing except S44b and S44c in FIG. 20 are identical to those in FIG. 18, the detailed descriptions of the pieces of processing except S44b and S44c are omitted.

In S44b, the motion consideration determination unit 38 (fit expression determination unit) specifies the expression having the largest face score in the face scores generated by the face score acquisition unit 32, and determines the which one of the predetermined expressions (the expressions in which the proximity score emerges easily (hardly)) corresponds to the expression having the largest face score. The motion consideration determination unit 38 decides whether the type of motion is determined (S44c). At this point, as described above, in the case that the previously-set expression is the expression in which the false estimation is easily generated (the proximity score emerges easily), the motion consideration determination unit 38 decides that the type of motion is determined when the expression having the largest face score is matched with the expression in which the false estimation is easily generated. On the other hand, in the case that the previously-set expression is the expression in which the false estimation is hardly generated (the proximity score emerges hardly), the motion consideration determination unit 38 decides that the type of motion is not determined when the expression having the largest face score is matched with the expression in which the false estimation is hardly generated.

When deciding that the type of motion is determined (YES in S44c), the motion consideration determination unit 38 issues the instruction to the motion detector 33 to detect the motion. Therefore, the pieces of processing in S44 to S46 are performed, and the expression estimation result calculated using the face score and the motion score is output in S47.

On the other hand, when deciding that the type of motion is not determined (NO in S44c), the motion consideration determination unit 38 notifies the expression decision unit 35 of no necessity to consider the motion. Therefore, the expression decision unit 35 decides the face score generated in S43 to be the expression estimation result (S48), and outputs the expression estimation result (S47).

Modifications

In one or more of the above embodiments, by way of example, the face score is generated at first, the motion score is acquired, and the expression estimation result is calculated based on the face score and the motion score. The sequence of the generation of the face score and the acquisition of the motion score is not limited to the above embodiments. That is, the face score may be generated after the motion score is acquired, or the acquisition of the motion score and the generation of the face score may concurrently be performed.

In one or more of the above embodiments, by way of example, the expression is estimated using the face score and the motion score. In one or more of the above embodiments, the expression is estimated in consideration of the face expression and the type of motion, but the expression estimation is not limited to the above embodiments. For example, the expression may be estimated using a table in which the expression corresponding to a combination of the face expression and the type of motion is specified. In the case that the table like this is used, the face expression and the type of motion are specified from the person image, and the expression corresponding to the combination of the face expression and the type of motion is specified from the table, and decided to be the final estimation result of the expression.

(Implementation Example by Software)

The control block (specifically, controller 3) of each of the expression estimation devices 1, 50, 100, and 150 may be constructed with a logic circuit (hardware) formed in an integrated circuit (IC chip) or software using a CPU (Central Processing Unit).

In the latter, each of the expression estimation devices 1, 50, 100, and 150 includes the CPU that issues a command of the program that is of the software implementing various functions, a ROM (Read Only Memory) or a storage device (hereinafter referred to as a "recording medium") in which the program and various pieces of data are recorded while being readable with a computer (or CPU), and a RAM (Random Access Memory) in which the program is expanded. The computer (or CPU) reads the program from the recording medium to execute the program. "Non-temporary material mediums" such as a tape, a disk, a card, a semiconductor memory, and a programmable logic circuit can be used as the recording medium. The program may be supplied to the computer through any transmission carrier (such as a communication network and a broadcasting wave) through which the program can be transmitted. One or more embodiments of the present invention can also be implemented in the form of a data signal embedded in a carrier wave in which the program is materialized by electronic transmission.

The present invention is not limited to the above embodiments, but various changes can be made without departing from the scope of the present invention. That is, an embodiment obtained by an appropriate combination of technical means disclosed in the different embodiments is also included in the present invention.

One or more embodiments of the present invention can be applied to the expression specification of the person in the image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An expression estimation device configured to estimate an expression of a person from an image, the expression estimation device comprising:
   an expression determination unit that analyzes the image of the person to generate first expression information indicating an expression of the person;
   a motion determination unit that analyzes the image of the person to determine a type of motion of the person; and
   an expression estimation unit that generates second expression information indicating the expression of the person according to the first expression information generated by the expression determination unit and the type of motion determined by the motion determination unit,
   wherein the first expression information is information in which a fitness for each of the different expressions is indicated in terms of numerical value, and
   wherein the expression estimation unit generates the second expression information by correcting the numerical value of the first expression information using predetermined correction information on each type of motion.

2. The expression estimation device according to claim 1, further comprising:
   a motion registration unit that stores the motion assigned in the image while correlating the type of motion and the correction information on the motion with each other.

3. The expression estimation device according to claim 1, further comprising:
   an attribute determination unit that analyzes the image to determine which predetermined attribute corresponds to the person,
   wherein the expression estimation unit generates the second expression information by correcting the numerical value of the first expression information using the predetermined correction information on each type of motion, and
   wherein the correction information corresponds to the attribute determined by the attribute determination unit.

4. The expression estimation device according to claim 1, further comprising:
   a fitness proximity determination unit that determines whether a difference between the fitness having the largest numerical value and the fitness having the second largest numerical value in the first expression information is greater than or equal to a predetermined upper limit,
   wherein the expression estimation unit generates the first expression information as the second expression information without using the correction information when the fitness proximity determination unit determines that the difference is greater than or equal to the upper limit, and
   wherein the expression estimation unit generates the second expression information using the correction information when the fitness proximity determination unit determines that the difference is less than the upper limit.

5. The expression estimation device according to claim 1, further comprising:
a fit expression determination unit that determines whether the expression in which the fitness has the largest numerical value in the first expression information is matched with a predetermined expression, and
wherein the fit expression determination unit decides whether the motion determination unit determines the type of motion according to a result of the determination,
wherein the expression estimation unit generates the second expression information using the correction information when the motion determination unit determines the type of motion, and
wherein the expression estimation unit generates the first expression information as the second expression information without using the correction information when the motion determination unit does not determine the type of motion.

6. The expression estimation device according to claim 2, further comprising:
an attribute determination unit that analyzes the image to determine which predetermined attribute corresponds to the person,
wherein the expression estimation unit generates the second expression information by correcting the numerical value of the first expression information using the predetermined correction information on each type of motion, and
wherein the correction information corresponds to the attribute determined by the attribute determination unit.

7. The expression estimation device according to claim 2, further comprising:
a fitness proximity determination unit that determines whether a difference between the fitness having the largest numerical value and the fitness having the second largest numerical value in the first expression information is greater than or equal to a predetermined upper limit,
wherein the expression estimation unit generates the first expression information as the second expression information without using the correction information when the fitness proximity determination unit determines that the difference is greater than or equal to the upper limit, and
wherein the expression estimation unit generates the second expression information using the correction information when the fitness proximity determination unit determines that the difference is less than the upper limit.

8. The expression estimation device according to claim 3, further comprising:
a fitness proximity determination unit that determines whether a difference between the fitness having the largest numerical value and the fitness having the second largest numerical value in the first expression information is greater than or equal to a predetermined upper limit,
wherein the expression estimation unit generates the first expression information as the second expression information without using the correction information when the fitness proximity determination unit determines that the difference is greater than or equal to the upper limit, and
wherein the expression estimation unit generates the second expression information using the correction information when the fitness proximity determination unit determines that the difference is less than the upper limit.

9. The expression estimation device according to claim 2, further comprising:
a fit expression determination unit that determines whether the expression in which the fitness has the largest numerical value in the first expression information is matched with a predetermined expression, and
wherein the fit expression determination unit decides whether the motion determination unit determines the type of motion according to a result of the determination,
wherein the expression estimation unit generates the second expression information using the correction information when the motion determination unit determines the type of motion, and
wherein the expression estimation unit generates the first expression information as the second expression information without using the correction information when the motion determination unit does not determine the type of motion.

10. The expression estimation device according to claim 3, further comprising:
a fit expression determination unit that determines whether the expression in which the fitness has the largest numerical value in the first expression information is matched with a predetermined expression, and
wherein the fit expression determination unit decides whether the motion determination unit determines the type of motion according to a result of the determination,
wherein the expression estimation unit generates the second expression information using the correction information when the motion determination unit determines the type of motion, and
wherein the expression estimation unit generates the first expression information as the second expression information without using the correction information when the motion determination unit does not determine the type of motion.

11. A method for controlling, via computer, an expression estimation device configured to estimate an expression of a person from an image, the control method comprising:
acquiring the image from an image capturing device;
analyzing the image to generate first expression information indicating the expression of the person;
analyzing the image to determine a type of motion of the person; and
generating second expression information indicating the expression of the person according to the first expression information and the type of motion,
wherein the first expression information is information in which a fitness for each of the different expressions is indicated in terms of numerical value, and
wherein the expression estimation unit generates the second expression information by correcting the numerical value of the first expression information using predetermined correction information on each type of motion.

12. A control program stored on a non-transitory computer-readable medium configured to estimate an expression of a person from an image, the control program causing a computer to perform:
analyzing the image to generate first expression information indicating the expression of the person;
analyzing the image to determine a type of motion of the person; and generating second expression information indicating the expression of the person according to the first expression information and the type of motion, wherein the first expression information is information in which a fitness for each of the different expressions is indicated in terms of numerical value, and wherein the expression estimation unit generates the second expression information by correcting the numerical value of the first expression information using predetermined correction information on each type of motion.

* * * * *